United States Patent
Strumolo et al.

(10) Patent No.: US 7,158,051 B2
(45) Date of Patent: Jan. 2, 2007

(54) LANE CHANGING ASSIST SYSTEM FOR AN AUTOMOTIVE VEHICLE

(75) Inventors: Gary S. Strumolo, Bevery Hills, MI (US); Hanaan Elmessiri, Inkster, MI (US); David M. DiMeo, Windsor (CA); Ronald H. Miller, Saline, MI (US); Aric David Shaffer, Ypsilanti, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 104 days.

(21) Appl. No.: 10/709,900

(22) Filed: Jun. 4, 2004

(65) Prior Publication Data

US 2004/0246112 A1 Dec. 9, 2004

Related U.S. Application Data

(60) Provisional application No. 60/476,520, filed on Jun. 6, 2003.

(51) Int. Cl.
*G08G 1/16* (2006.01)
*B60Q 1/00* (2006.01)

(52) U.S. Cl. ............... 340/903; 340/435; 340/436; 340/941; 340/961; 180/167; 701/301

(58) Field of Classification Search ........ 340/903, 340/435
See application file for complete search history.

(56) References Cited

U.S. PATENT DOCUMENTS

| | | | | |
|---|---|---|---|---|
| 4,802,096 A | * | 1/1989 | Hainsworth et al. | 701/301 |
| 5,134,371 A | * | 7/1992 | Watanabe et al. | 324/252 |
| 5,471,214 A | * | 11/1995 | Faibish et al. | 342/70 |
| 5,767,766 A | * | 6/1998 | Kwun | 340/436 |
| 6,094,610 A | * | 7/2000 | Steffens et al. | 701/45 |
| 6,437,561 B1 | * | 8/2002 | Bartingale et al. | 324/207.22 |
| 6,714,127 B1 | * | 3/2004 | Perez et al. | 340/467 |
| 6,784,792 B1 | * | 8/2004 | Mattes et al. | 340/436 |
| 2004/0056652 A1 | * | 3/2004 | Bomya | 324/207.17 |
| 2004/0233048 A1 | * | 11/2004 | Luna et al. | 340/435 |

* cited by examiner

*Primary Examiner*—Donnie L. Crosland
(74) *Attorney, Agent, or Firm*—Frank A. MacKenzie; Artz & Artz, P.C.

(57) ABSTRACT

A host vehicle system includes a lane change system providing an indication to the host vehicle a target vehicle entering a destination lane. The system includes arrays of magneto-resistive sensors on both sides of the vehicle receiving proximity information as a function of magnetic field variations, a vehicle bus receiving various vehicle control signals, a smart algorithm controller analyzing bus signals and sensor signals, and various vehicle collision systems such as passive restraints, optical light guides, and audible warnings operating in response to a threat from a target vehicle.

20 Claims, 3 Drawing Sheets

LANE CHANGING ASSIST SYSTEM FOR AN AUTOMOTIVE VEHICLE

CROSS REFERENCE TO RELATED APPLICATIONS

The present invention claims priority to provisional application No. 60/476,520 filed on Jun. 6, 2003.

BACKGROUND OF INVENTION

The present invention relates generally to collision warning systems, and more particularly to a method and apparatus for warning a vehicle operator of another vehicle within a destination lane of the vehicle.

Collision warning systems are becoming more widely used. In general, collision warning systems provide a vehicle operator knowledge and awareness of objects or vehicles within close proximity so as to prevent a collision with those objects. Current collision warning systems are unitary in nature in that they only warn the operator of the vehicle containing the collision warning system of a potential collision. A sensor located on a vehicle, upon sensing an object generates an object detection signal, which is communicated to the operator of that vehicle.

Warning systems for vehicles that are directed to the rear of the vehicle are known. However, high end warning systems require expensive sensors and sensing equipment. Conversely, most inexpensive systems cannot provide the required performance across all ranges of environment conditions and target types.

Also, current sensing systems tend to monitor near zones of the vehicle without monitoring the transition of a target vehicle as it moves into a destination lane of the host vehicle.

Therefore, it would be desirable to provide an improved lane change system. The improved system should increase reaction time and decrease the probability of a collision occurring, while reducing costs associated with the system.

SUMMARY OF INVENTION

In one aspect of the invention, a host vehicle system includes a lane change system providing an indication to the host vehicle of a target vehicle entering a destination lane. The system includes arrays of magneto-resistive sensors receiving proximity information as a function of magnetic field variations, a vehicle bus receiving various vehicle control signals, a smart algorithm controller analyzing bus signals and sensor signals, and various vehicle collision systems such as passive restraints, optical light guides, and audible warnings operating in response to a threat from a target vehicle.

In a further aspect of the invention, a method for operating a lane change assist system for a host vehicle includes sensing magnetic field changes, within a sensor array, caused by a target vehicle in or near a vehicle destination lane. A magnetic field signature is generated as a function of the magnetic field changes. At least one algorithm is processed as a function of the magnetic field signature, and a countermeasure is activated in response to signals indicating a target vehicle in or near the vehicle destination lane as a function of the processing of the algorithm.

Accordingly, an advantage of the present invention is to provide an improved lane change system for use in an automotive vehicle.

Advantages previously used optical and hall sensor techniques are numerous in that these sensors are inexpensive, are well suited for variable temperatures and rugged environments, and offer excellent response and significantly less need for readjustment when the system is jostled or vibrating.

Another advantage of the present invention is that it increases the reaction time for both operators of the target vehicle and the approaching vehicle. Thereby, decreasing the probability of a collision between the two vehicles.

Other advantages and features of the present invention will become apparent when viewed in light of the detailed description of the preferred embodiment when taken in conjunction with the attached drawings and appended claims.

DETAILED DESCRIPTION

Figure 1:
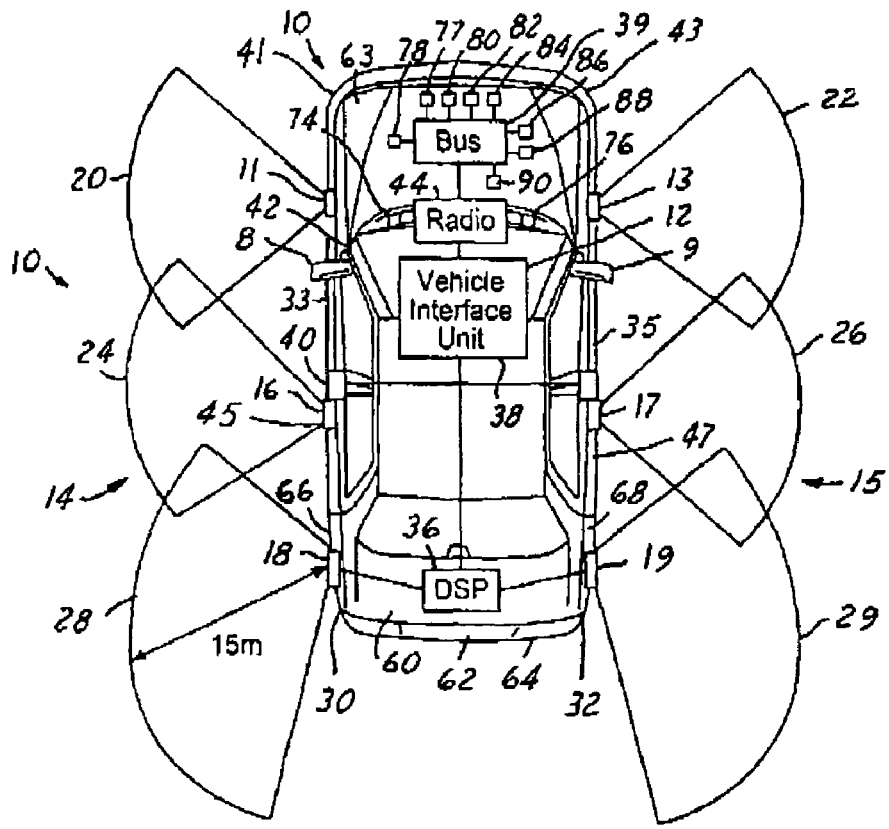
FIG. 1 is a top diagrammatic view of a host vehicle in accordance with one embodiment of the present invention.

In the following figures the same reference numerals will be used to illustrate the same components. While the present invention is described with respect to a particular method and apparatus for lane change, various adaptations will be evident to those skilled in the art.

Figure 2:
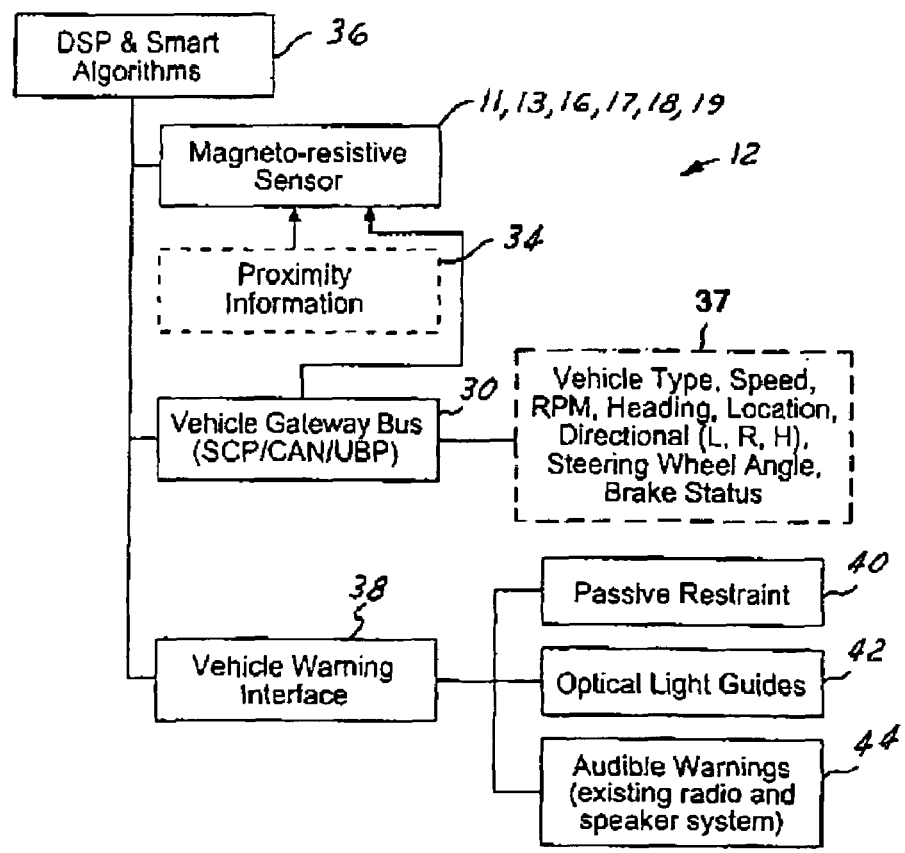
FIG. 2 is a system diagram of the host vehicle of FIG. 1.

Referring now to FIGS. 1 and 2, a host vehicle system 10 having a lane change system 12, in accordance with one embodiment of the present invention, is illustrated. Representations of destination lanes 14, 15 are illustrated. The destination lanes 14, 15 are the areas adjacent the vehicle 10 including a lane 14 on the driver's side 8 and a lane 15 on the passenger-side 9. Destination lanes 14, 15 are lanes into which the host vehicle 10 is moving; or lanes from which a target vehicle is approaching the host vehicle 10.

The lane change system 12 provides an indication to the host vehicle driver as to the entering of a target vehicle within at least one of the destination lanes 14, 15 or within a close proximity to the host vehicle 10. The system 12 includes a vehicle bus 39 receiving various vehicle control signals 37 magneto-resistive sensors 11, 13, 16, 17, 18, 19 receiving proximity information 34, a smart algorithm controller 36 (digital signal processor and smart algorithms), a vehicle warning interface 38, and various vehicle collision systems such as passive restraints 40, optical light guides 42, and audible warnings 44. All of these devices will be discussed later.

The host vehicle 10 includes six magneto-resistive sensors 11, 13, 16, 17, 18, 19 having respective fields of view 20, 22, 24, 26, 28, 29. The fields of view 20, 22, 24, 26, 28, 29 may not overlap or may slightly overlap destination lanes 14, 15. For situations wherein fields of view overlap, sensors 11, 16, 18 are considered a first array and sensors 13, 17, 19 are considered a second array. Important to note is that any number of sensors may be used to improve coverage of areas surrounding the host vehicle 10.

Further, the fields of view 20, 24, 28 and 22, 26, 29 are considered either near zones of the host vehicle 10 or alternately including near zones of the host vehicle 10. In other words, the fields of view 20, 24, 28 may be considered covering a near-driver side area covering at least the length of the driver's side 8 of the host vehicle 10 and an area adjacent thereto (e.g. having a range of 15 meters from the sensors 11, 16, 18); and the fields of view 22, 26, 29 may be considered covering a near-passenger side area 9 of the host vehicle 10, also covering at least the length of the host vehicle 10 and an area adjacent thereto (e.g. having a range of 15 meters from the sensors 13, 17, 19).

The present invention also monitors the transition of the host vehicle 10 from the sensor fields of view 20, 22, 24, 26, 28, 29 to the destination lanes 14, 15. Sensors 11, 13, 16, 17, 18, 19 are preferably magneto-resistive sensors.

Today's technology allows small sensors to be placed inconspicuously on front panels 41, 43, rear panels 30, 32 or side panels 45, 47 of the vehicle so as not to become aesthetically displeasing. Various locations on the vehicle 10 including the trunk lid 60, the tailgate 62, the hood 63, the bumper 64, an area above the tires 66, 68, an area within vehicle rear panels 30, 32, side panels 45, 47, or front panels 41, 43 may all be desirable locations for the sensors 11, 13, 16, 17, 18, 19.

The sensors 11, 13, 16, 17, 18, 19, sense target objects or vehicles. A target vehicle is any vehicle proceeding from behind or next to the host vehicle 10 entering into one of the destination lanes 14, 15 and approaching the host vehicle 10 on the driver-side 8 or passenger-side 9. A target vehicle is further considered a vehicle in a destination lane 14, 25 into which the host vehicle 10 is attempting to move.

The lane change system 12 provides an indication to the host vehicle driver as to the entering of a target vehicle within at least one of the destination lanes 14, 15 or within a close proximity to the host vehicle 10. The system 12 includes a vehicle bus 39 receiving various vehicle control signals 37 magneto-resistive sensors 11, 13, 16, 17, 18, 19 receiving proximity information 34, a smart algorithm controller 36 (digital signal processor and smart algorithms), a vehicle warning interface 38, and various vehicle collision systems such as passive restraints 40, optical light guides 42, and audible warnings 44. AU of these devices will be discussed later.

Figure 3A:
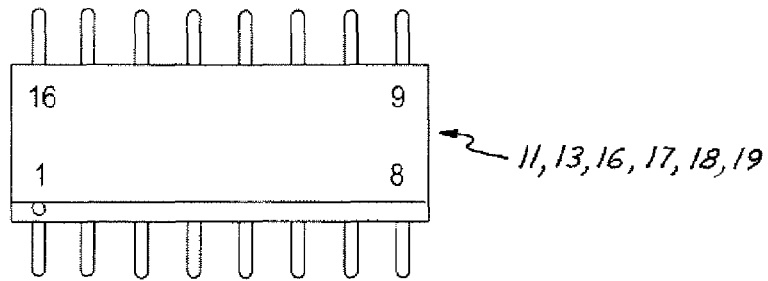
FIG. 3A is a top view of a magneto-resistive sensor in accordance with another embodiment of the present invention.
Figure 3B:
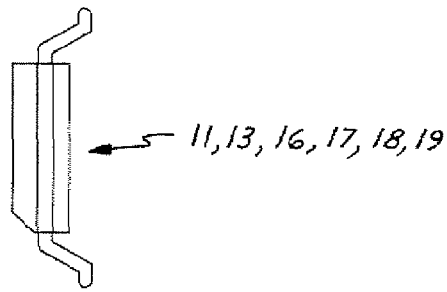
FIG. 3B is a side view of FIG. 3A.

The magneto-resistive sensors 11, 13, 16, 17, 18, 19, which are illustrated in FIGS. 3A and 3B, receive proximity information 34 from areas 20, 22, 24, 26, 28, 29. A top view of a sensor 11, 13, 16, 17, 18, or 19 is illustrated in FIG. 3A, and a side view of the sensor 11, 13, 16, 17, 18, or 19 is illustrated in FIG. 3B.

Sensors 11, 13, 16, 17, 18, 19 are embodied as passive such that no power is required in order to activate the system 12; however, signals received from the sensors 11, 13, 16, 17, 18, 19 are in the form of changes in current as a function of magnetic field changes. The magneto-resistive sensors 11, 13, 16, 17, 18, 19 make use of magnetic field changes that occur when metallic compounds, such as target vehicles, pass within close proximity of their respective permanent magnets. The field changes are received in the controller 36 to determine the properties of the target vehicle's motion. These small sensors 11, 13, 16, 17, 18, 19 are effective in observing linear as well as circular motion.

The magneto-resistive sensors 11, 13, 16, 17, 18, 19 are mounted in the front quarter panels or first portions 41, 43, the side panels or second portions 45, 47, and the rear quarter panels or third portions 30, 32 of the vehicle 10 as displayed in FIG. 1. The sensors 11, 13, 16, 17, 18, 19 can determine the magnitude and direction of magnetic field variation within a range of, for example, 15 meters. These sensors 11, 13, 16, 17, 18, 19 have sufficient sensitivity to measure variations in the Earth's magnetic field to, for example, 1 part in 12000. Once a sufficient magnetic field variation is observed and is correlated to the vehicle's dynamics in the controller 36, a suitable countermeasure is determined and implemented.

The first magneto-resistive sensor 11 senses a first magnetic field variation in a first sensor area 20, the second magneto-resistive sensor 13 senses a second magnetic field variation in a second sensor area 22, the third magneto-resistive sensor 16 senses a third magnetic field variation in a third sensor area 24, the fourth magneto-resistive sensor 17 senses a fourth magnetic field variation in a fourth sensor area 26, the fifth magneto-resistive sensor 18 senses a fifth magnetic field variation in a fifth sensor area 28, the sixth magneto-resistive sensor 18 senses a sixth magnetic field variation in a sixth sensor area 29. In other words, in response to target vehicles entering one or more of the sensor areas 20, 22, 24, 26, 28, 29, signals are generated through the respective sensors 11, 13, 16, 17, 18, 19 as a function of magnetic field variation.

Figure 5:
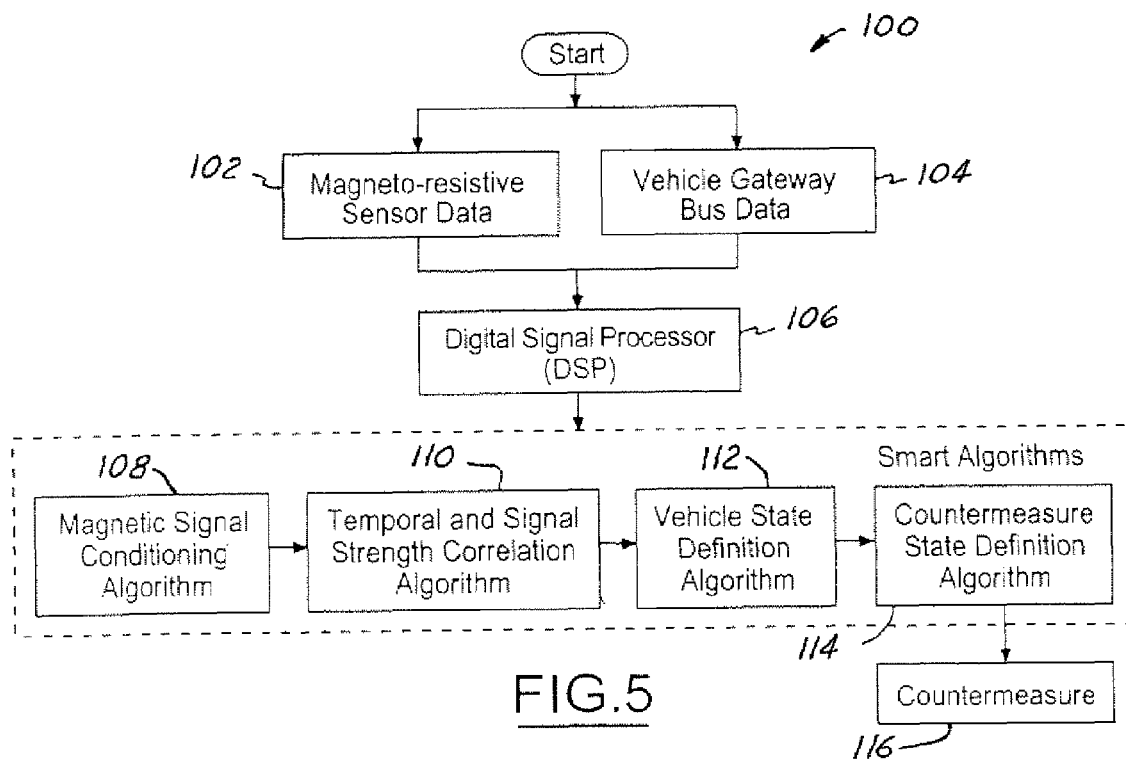
FIG. 5 is a flow chart of the operation of the lane change system.

The smart algorithm controller 36 or Digital Signal Processor (DSP), including logic further illustrated in FIG. 5, implements advanced algorithms for processing signals from the vehicle bus 39 and the magneto-resistive sensors 11, 13, 16, 17, 18, 19. These advanced algorithms, also referred to as smart algorithms, include, for example, a magnetic signal conditioning algorithm including filtering and smoothing algorithms, a temporal and signal strength correlation algorithm, a vehicle state definition algorithm, and a countermeasure state definition algorithm.

The controller 36 is preferably a microprocessor-based controller having a central processing unit, internal memory such as RAM or ROM, and associated inputs and outputs communicating across the 39 bus. The controller 36 may be a portion of a central vehicle main control unit or stand-alone unit. The controller 36 may include various processing units which may be incorporated as separate devices or as an integral part of the controller.

The controller 36 receives information from the magneto-resistive sensor (MRS) and vehicle status data from the vehicle gateway bus. In real-time, the advanced algorithms determine the likelihood of a threat on the roadway. Once the severity of a threat has been determined, the controller 36 communicates through the vehicle interface unit 38 that can result in optical, audible, or voice warnings, including the use of a passive restraint system 40.

The vehicle interface unit 38 or vehicle warning interface receives signals from the controller 36 and activates vehicle systems including, for example, optical warnings from dashboard lights 74 or light guides 42 or a light emitting diode (LED), audible warnings from the radio 44 or a speaker, visual earnings from a heads-up display, or voice warnings from a pre-crash warning system 76. The embodied interface unit 38 also activates the passive restraint system 40 when a threat in the destination lane is determined by the controller 36.

The vehicle bus 39 receives various vehicle control signals 37 and generates therefrom vehicle status data. Sensors and control units generating vehicle control signals include, for example, a vehicle type information unit 77 generating vehicle type information, vehicle speed sensors 78 generating vehicle speed signals, an RPM (revolutions per minute) reader 80 generating RPM signals, a heading indicator 82 generating a heading of host vehicle signal, a location indicator 84 such as a GPS system generating a location of vehicle signal, a directional signal generator 86 generating a host vehicle directional signal (e.g. left, right, heading), a steering wheel angle sensor 88 generating a steering wheel angle signal, and a brake status sensor 90 generating a brake status signal. One skilled in the art will realize that the vehicle bus 39 may also receive various other sensor and control signals.

Figure 4A:
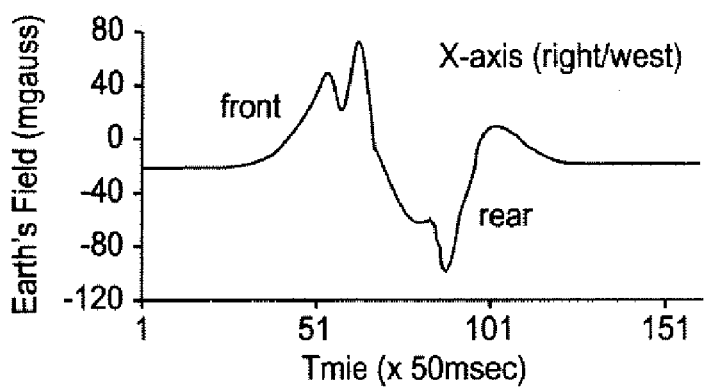
FIG. 4A is a graph of magneto-resistive sensor properties of a sensor in a westward direction, perpendicular to a direction of travel of a target vehicle.
Figure 4B:
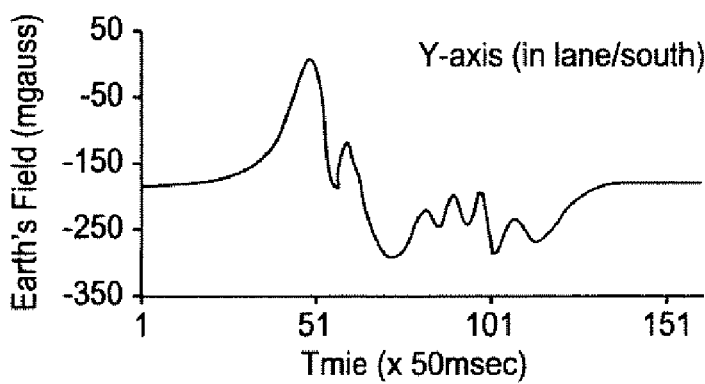
FIG. 4B is a graph of magneto-resistive sensor properties of the sensor of FIG. 4A in a southward direction, opposing a direction of travel of the target vehicle.
Figure 4C:
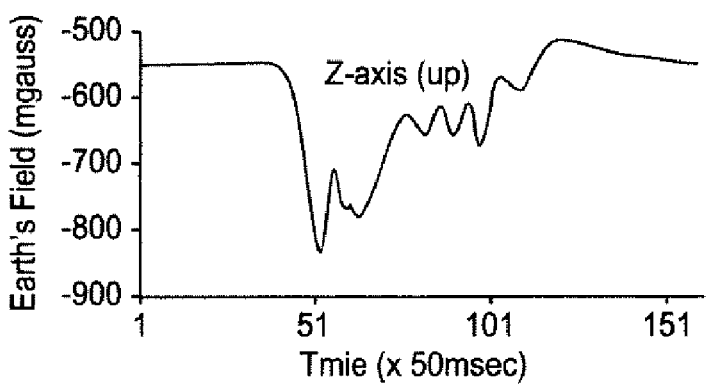
FIG. 4C is a graph of magneto-resistive sensor properties of the sensor of FIG. 4A in an upwards direction, perpendicular to the earth over which the target vehicle is passing.
Figure 4D:
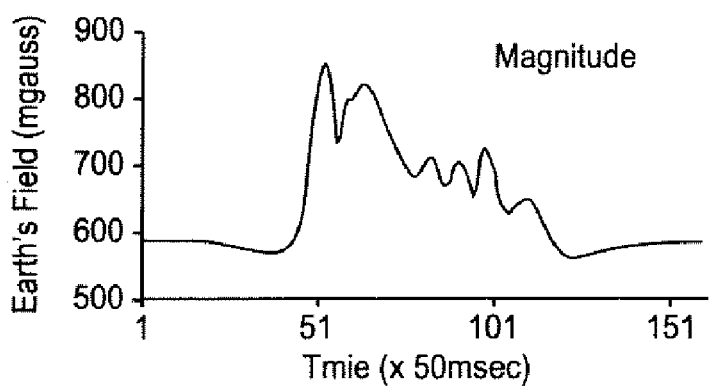
FIG. 4D is a graph of magneto-resistive sensor properties of the sensor of FIG. 4A wherein a magnitude of the target vehicle is illustrated.

Referring now to FIGS. 4A–4D, experimental results of magneto-resistive sensors sensing a target vehicle passing a host vehicle are illustrated. As illustrated, the magneto-resistive sensors 11, 13, 16, 17, 18, 19 can easily determine the presence of the target vehicle in a host vehicle destination lane and detect the relative motion of the vehicles, which may be used in threat detection algorithms. FIG. 4A is a graph of magneto-resistive sensor properties of a sensor is in a westward direction, perpendicular to a direction of travel of a passing vehicle. FIG. 45 is a graph of magneto-resistive sensor properties of the sensor of FIG. 4A in a southward direction, opposing a direction of travel of the passing vehicle. FIG. 4C is a graph of magneto-resistive sensor properties of the sensor of FIG. 4A in an upwards direction, perpendicular to the earth over which the vehicle is passing. FIG. 4D is a graph of magneto-resistive sensor properties of the sensor of FIG. 4A wherein a magnitude of the passing vehicle is illustrated.

Referring to FIG. 5, a flow chart 100 of the operation of the lane change system, in accordance with another embodiment of the present invention, is illustrated. Logic starts in operation block 102 when a target vehicle or object is sensed in the sensor 11, 13, 16, 17, 18, or 19.

In operation block 104, the vehicle gateway bus 39 receives vehicle control signals 37 and generates therefrom a vehicle bus signals.

In operation block 106, the controller 36 or digital signal processor receives the change of current or magnetic field signature from the sensor 11, 13, 16, 17, 18, or 19 and the vehicle bus signals and activates various algorithms to process the signals.

In operation block 108, a magnetic signal conditioning algorithm is activated; and the magnetic field signature is filtered and smoothed.

In operation block 110, a temporal and signal strength correlation algorithm is activated; and the magnetic field signature is analyzed to determine the proximity and size of the target vehicle.

In operation block 112, a vehicle state definition algorithm is activated; and the state of the host vehicle in relation to the target vehicle is determined.

In operation block 114, a countermeasure state definition algorithm is activated; and a determination is made whether a countermeasure is required and also which countermeasure may be required.

In operation block 116, countermeasures are activated in response to signals from operation block 114 indicating a target vehicle in or near a destination lane 14 or 15 of the host vehicle 10.

This technology is relatively low cost and holds the potential to be implemented with high operating performance.

In operation, a method for operating a lane change system for a host vehicle includes: sensing magnetic field changes caused by a target object in or near a vehicle destination lane and generating a magnetic field signature as a function of the magnetic field changes. The method also includes receiving a vehicle control signal from a vehicle system and generating a vehicle bus signal from the vehicle control signal.

The method still further includes processing an algorithm as a function of the vehicle bus signal and the magnetic field signature. This processing may include determining required countermeasures necessary to reduce a likelihood of an accident, processing a magnetic signal conditioning algorithm for filtering and smoothing the magnetic field signature, processing a temporal and signal strength correlation algorithm for analyzing the magnetic field signature for determining a proximity and size of the target object, processing a vehicle state definition algorithm whereby a state of the host vehicle in relation to the target object is determined, or processing a countermeasure state definition algorithm for determining whether a countermeasure is required and which countermeasure may be required.

In response to signals generated during the processing steps, a countermeasure is activated in response to signals indicating a target vehicle in or near the vehicle destination lane.

While particular embodiments of the invention have been shown and described, numerous variations and alternate embodiments will occur to those skilled in the art. Accordingly, it is intended that the invention be limited only in terms of the appended claims.

What is claimed is:

1. A warning system for a host vehicle having a driver-side, a passenger-side, a front end, and a rear end, said warning system comprising:

a first magneto-resistive sensor coupled to a first portion of the driver-side of the host vehicle, said first magneto-resistive sensor adapted for sensing a first magnetic field variation in a first sensor area near the host vehicle and generating a first sensor signal therefrom;

a second magneto-resistive sensor coupled to a first portion of the passenger-side of the host vehicle, said second magneto-resistive sensor adapted for sensing a second magnetic field variation in a second sensor area near the host vehicle and generating a second sensor signal therefrom;

a third magneto-resistive sensor coupled to a second portion of the driver-side of the host vehicle, said third magneto-resistive sensor adapted for sensing a third magnetic field variation in a third sensor area near the host vehicle and generating a third sensor signal therefrom;

a fourth magneto-resistive sensor coupled to a second portion of the passenger-side of the host vehicle, said fourth magneto-resistive sensor adapted for sensing a fourth magnetic field variation in a fourth sensor area near the host vehicle and generating a fourth sensor signal therefrom; and a controller coupled to the host vehicle receiving at least one of said first sensor signal, said second sensor signal, said third sensor signal, or said fourth sensor signal, said controller monitoring lane change transition of an object relative to the host vehicle and activating a vehicle system in response to said at least one of said sensor signals and said lane change transition.

2. The system of claim 1 further comprising a vehicle bus receiving various vehicle control signals and generating therefrom a vehicle bus signal, wherein said controller generates said signal for activating said vehicle system as a function of said vehicle bus signal.

3. The system of claim 2, wherein said vehicle bus receives at least one of a vehicle type information signal, a vehicle speed signal, an RPM signal, a heading of host vehicle signal, a location of vehicle signal, a host vehicle directional signal, a steering wheel angle signal, or a comprising brake status signal and generates said vehicle bus signal as a function of said vehicle type information signal at least one of said signals.

4. The system of claim 1 further comprising a vehicle warning interface receiving said signal for activating said vehicle system from said controller, said vehicle warning interface activating said vehicle system in response to said signal for activating said vehicle system.

5. The system of claim 4, wherein said vehicle system comprises at least one of a dashboard light, a light guide, an LED, a radio, a speaker, a pre-crash warning system, a heads-up display, or a passive restraint system.

6. The system of claim 1 further comprising a fifth magneto-resistive sensor coupled to a third portion of the driver-side of the host vehicle, said fifth magneto-resistive sensor sensing a fifth magnetic field variation in a fifth sensor area and generating a fifth sensor signal therefrom; and
a sixth magneto-resistive sensor coupled to a third portion of the passenger-side of the host vehicle sensing a sixth magnetic field variation in a sixth sensor area and generating a sixth sensor signal therefrom,
wherein said controller receives at least one of said first sensor signal, said second sensor signal, said third sensor signal, said fourth sensor signal, said fifth sensor signal or said sixth sensor signal, said controller generating said signal for activating said vehicle system in response to said at least one of said signals.

7. The system of claim 6, wherein said first portion of said driver side and said first portion of said passenger side comprise portions near the front end, said second portion of said driver side and said second portion of said passenger side comprise portions between the front end and the rear end, and said third portion of said driver side and said third portion of said passenger side comprise portions near the rear end.

8. The system of claim 1, wherein said first sensor is coupled to at least one of an area near a rear of the vehicle, an area near a middle of the vehicle, an area near a front of the vehicle, a trunk lid, a tailgate, a hood, a bumper, an area above tires of the vehicle, or an area within vehicle side panels.

9. The system of claim 1, wherein said controller further comprises at least one of a signal conditioning algorithm, a temporal and signal strength correlation algorithm, a vehicle state definition algorithm, or a countermeasure state definition algorithm for generating said signal for activating said vehicle system.

10. The system of claim 9, wherein said temporal and signal strength correlations algorithms is used in conjunction with a threshold comparison to assess a probability of an accident.

11. A method for operating a lane change aid detection system for a host vehicle comprising:
determining heading of the host vehicle;
sensing magnetic field changes, caused by a target object in or near a vehicle destination lane of the host vehicle, within a sensor array having a detection range covering an area adjacent a full near zone of the host vehicle;
processing at least one algorithm as a function of said magnetic field changes; and
activating a countermeasure in response to said heading and signals, indicating a target vehicle in or near said vehicle destination lane, as a function of said processing of said at least one algorithm.

12. The method of claim 11 further comprising receiving a vehicle control signal;
generating a vehicle bus signal from said vehicle control signal; and
processing said at least one algorithm as a function of said vehicle bus signal.

13. The method of claim 12, wherein said vehicle bus receives at least one of a vehicle type information signal, a vehicle speed signal, an RPM signal, a heading of host vehicle signal, a location of vehicle signal, a host vehicle directional signal, a steering wheel angle signal, or a brake status signal and generates said vehicle bus signal as a function of said at least one of said signals.

14. The method of claim 11, wherein processing further comprises determining required countermeasures necessary to reduce a likelihood of an accident.

15. The method of claim 11, wherein processing further comprises processing a magnetic signal conditioning algorithm for filtering and smoothing said magnetic field signature.

16. The method of claim 11, wherein processing further comprises processing a temporal and signal strength correlation algorithm for analyzing said magnetic field signature for determining a proximity and size of said target object.

17. The method of claim 11, wherein processing further comprises processing a vehicle state definition algorithm whereby a state of the host vehicle in relation to said target object is determined.

18. The method of claim 11, wherein processing further comprises processing a countermeasure state definition algorithm for determining whether a countermeasure is required and which countermeasure may be required.

19. A lane change aid detection system for a host vehicle comprising:
a first array of magneto-resistive sensors coupled along a driver-side of the host vehicle and sensing a first array of sensor areas covering a near driver-side area extending at least a length of said driver-side and an area adjacent thereto, said first array of magneto-resistive sensor sensing a first magnetic field variation in said first array of sensor areas, at least one of said first array of magneto-resistive sensors generating a first sensor signal therefrom;
a second array of magneto-resistive sensors coupled along a passenger-side of the host vehicle and sensing a second array of sensor areas including a near passenger-side area covering at least a length of said passenger-side and an area adjacent thereto, said second array of magneto-resistive sensor sensing a second magnetic field variation in said second array of sensor areas, at least one of said second array of magneto-resistive sensors generating a second sensor signal therefrom;

a vehicle bus receiving various vehicle control signals and generating therefrom a vehicle bus signal;

a vehicle warning interface receiving a signal for activating said vehicle system, said vehicle warning interface activating said vehicle system in response to said signal for activating said vehicle system; and a controller coupled to the host vehicle detecting a target vehicle passing the host vehicle in response to said first sensor signal, said second sensor signal, and said vehicle bus signal, said controller generating said signal for activating a vehicle system in response to said passing.

20. The system of claim 19, wherein said vehicle system comprises at least one of a dashboard light, a light guide, an LED, a radio, a speaker, a pre-crash warning system, a heads-up display, or a passive restraint system.

* * * * *